United States Patent
Miura

(10) Patent No.: US 9,082,431 B2
(45) Date of Patent: Jul. 14, 2015

(54) DATA ARCHIVE SYSTEM AND QUALITY INSPECTION METHOD

(71) Applicant: Hitachi-LG Data Storage, Inc., Tokyo (JP)

(72) Inventor: Masayoshi Miura, Tokyo (JP)

(73) Assignee: HITACHI-LG DATA STORAGE, INC., Tokyo (JP)

( * ) Notice: Subject to any disclaimer, the term of this patent is extended or adjusted under 35 U.S.C. 154(b) by 0 days.

(21) Appl. No.: 14/194,097

(22) Filed: Feb. 28, 2014

(65) Prior Publication Data

US 2014/0286150 A1    Sep. 25, 2014

(30) Foreign Application Priority Data

Mar. 25, 2013   (JP) ................................. 2013-061295

(51) Int. Cl.
*G11B 7/24097*    (2013.01)
*G11B 20/18*    (2006.01)

(52) U.S. Cl.
CPC ........ *G11B 7/24097* (2013.01); *G11B 20/1816* (2013.01)

(58) Field of Classification Search
CPC ............... G11B 7/24097; G11B 20/18; G11B 20/1816; G11B 2220/40; G11B 2220/41; G11B 20/10305; G11B 19/048
USPC .............. 369/30.38, 53.1, 53.12, 53.11, 53.2, 369/53.22
See application file for complete search history.

(56) References Cited

U.S. PATENT DOCUMENTS

| | | | |
|---|---|---|---|
| 2003/0067697 A1* | 4/2003 | Weinstein et al. | 360/31 |
| 2006/0023595 A1* | 2/2006 | Erickson et al. | 369/53.2 |
| 2006/0168499 A1* | 7/2006 | Edwards et al. | 714/763 |
| 2008/0195886 A1* | 8/2008 | Takahashi | 714/2 |
| 2009/0059757 A1* | 3/2009 | Haustein et al. | 369/53.42 |
| 2009/0177721 A1* | 7/2009 | Mimatsu | 707/205 |
| 2012/0260266 A1* | 10/2012 | Tomii | 719/327 |
| 2013/0083638 A1* | 4/2013 | Edling et al. | 369/53.1 |
| 2013/0083639 A1* | 4/2013 | Wharton et al. | 369/53.1 |
| 2013/0166945 A1* | 6/2013 | Nakao et al. | 714/6.21 |
| 2014/0086032 A1* | 3/2014 | Nakao et al. | 369/53.35 |

FOREIGN PATENT DOCUMENTS

JP    2008-204580 A    9/2008

* cited by examiner

*Primary Examiner* — Thomas Alunkal
(74) *Attorney, Agent, or Firm* — Volpe and Koenig, P.C.

(57) ABSTRACT

Disclosed is a data archive system that executes inspection of a recording quality of an optical disc, estimates a recording quality deterioration factor, and informs it to a user, and a method for estimating the recording quality deterioration factor. The data archive system has a server and a data library device. The server has a whole control part, a data library I/F part, and a recording medium. The data library device has multiple recording media, a recording medium storing part, multiple recording/reproducing parts, and a library control part. The recording medium stores attribute information about the recording medium. The whole control part executes first quality inspection on a first recording medium, executes second quality inspection on a second recording medium, refers to attribute information of the recording media recorded on the information recording medium, and controls so that a factor deteriorating the qualities of the recording media may be estimated.

8 Claims, 12 Drawing Sheets

FIG.10

| DISC ID | STORAGE DATE AND TIME | RECORDING START DATE AND TIME | LAST RECORDING DATE AND TIME | DRIVE HISTORY | STORAGE POSITION | INSPECTION HISTORY |
|---|---|---|---|---|---|---|
| 0001 | 2012/9/14 15:30:00 | 2012/9/14 18:00:20 | 2012/9/14 21:30:12 | A | L001 | 1E-5, 1.5E-5 |
| 0002 | 2012/9/14 15:30:00 | 2012/9/15 3:16:18 | 2012/9/16 1:02:05 | B,C | L002 | 1E-5, 1.2E-5 |
| 0003 | 2012/9/14 15:30:00 | 2012/9/16 9:20:11 | 2012/9/16 12:44:00 | A | L003 | 5E-6, 9E-6 |
| 0004 | 2012/10/30 8:45:00 | 2012/12/11 13:10:00 | 2012/12/30 7:55:46 | D,B,C | R026 | 1E-5 |
| 0005 | 2013/2/10 16:30:15 | 2013/3/8 4:13:29 | 2013/5/6 22:10:50 | C | R128 | 7E-6 |
| ⋮ | ⋮ | ⋮ | ⋮ | ⋮ | ⋮ | ⋮ |

DATA ARCHIVE SYSTEM AND QUALITY INSPECTION METHOD

CROSS-REFERENCE TO RELATED APPLICATION

This application claims the Japanese Patent Application No. 2013-061295 filed Mar. 25, 2013, which is incorporated herein by reference in its entirety.

BACKGROUND

The present invention relates to a data archive system and a quality inspection method.

As a background art of this technical field, there is Japanese Unexamined Patent Application Publication No. 2008-204580. Japanese Unexamined Patent Application Publication No. 2008-204580 describes: "An optical disc management device 100 measures a recording quality of an optical disc, generates disc management information and measurement history information, and further determines a next measurement period of the recording quality based on these pieces of disc management information and measurement history information. When the decided measurement period has come, the optical disc management device 100 measures the recording quality of the optical disc again."

SUMMARY

In Japanese Unexamined Patent Application Publication No. 2008-204580, it is not taken into consideration that a quality deterioration factor of an optical disc and an inspection object of a recording quality of the optical disc are dynamically changed. The present invention has objects to provide a data archive system that executes recording quality inspection of an optical disc efficiently, estimates the recording quality deterioration factor by recording quality inspection of the optical disc, and notifies it to a user, and a method for estimating the recording quality deterioration factor by the recording quality inspection of the optical disc.

In order to address the above-mentioned problem, a configuration described in "what is claimed is" is adopted, for example.

According to the present invention, it is possible to estimate that there is a possibility that a factor causing recording quality deterioration may exist by the recording quality inspection of the optical disc and to notify it to the user. Moreover, it is possible to improve an efficiency of the recording quality inspection of the optical disc.

Problems, configurations, and effects except what was described above will be clarified by explanations of the following embodiments.

BRIEF DESCRIPTION OF THE DRAWINGS

FIG. 10 is a table showing one example of contents of disc-related information;

DETAILED DESCRIPTION

Hereinafter, embodiments will be described using drawings.

First Embodiment

Figure 1:
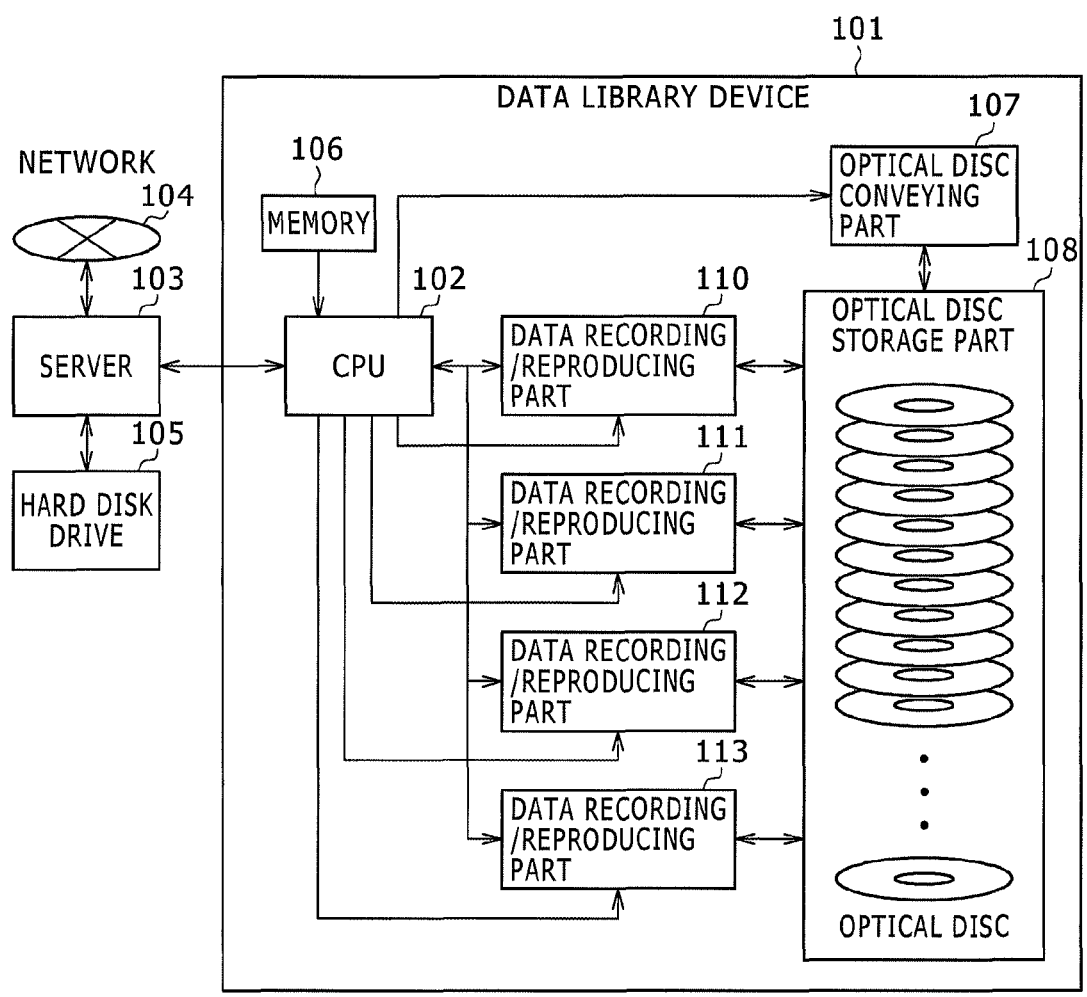
FIG. 1 is a block diagram showing a configuration of a data library device.

FIG. 1 is a block diagram showing a configuration of a data library device. 101 is the data library device, which receives data from a network 104 at the time of recording and records it in a hard disk drive 105 through a server 103, and records the recorded data on an optical disc 109. It reproduces the data from the hard disk drive 105 or the optical disc 109 at the time of reproduction, and sends it to the network 104 through the server 103.

103 is the server, which controls a data library device 101 by communication with a CPU (Central Processing Unit) 102 that the data library device 101 has built in, at the same time controls the hard disk drive 105, and performs recording/reproduction of the data and data management of transmission and reception of the data through the network 104, etc.

105 is the hard disk drive, which is controlled by the server 103 and records data sent from the network 104. Although the hard disk drive 105 was illustrated on the outside of the server 103 in FIG. 1, a configuration in which it is included in the server 103 may be used.

109 is the optical disc, and multiple optical discs 109 are stored inside an optical disc storing part 108. Although only one optical disc storing part 108 is illustrated in FIG. 1, multiple parts 108 may be built in, and they may be used properly according to its purpose, for example, one is as an unrecorded disc storing part, the other is as an already-recorded disc storing part, etc. Naturally, the inside of the optical disc storing part 108 may be partitioned into an unrecorded disc storing region and an already-recorded disc storing region.

The optical disc 109 is taken out from the optical disc storing part 108 by an optical disc conveying part 107 at the time of data recording, is loaded into any one of data recording/reproducing parts 110, 111, 112, and 113, and is returned to the optical disc storing part 108 by the optical disc conveying part 107 when the data recording is ended.

On the other hand, the optical disc 109 is taken out from the optical disc storing part 108 by the optical disc conveying part 107 at the time of data reproduction, is loaded into any one of the data recording/reproducing parts 110, 111, 112, and 113 to reproduce the data, and is returned to the optical disc storing part 108 by the optical disc conveying part 107 when the data reproduction is ended.

110, 111, 112, and 113 are the data recording/reproducing parts, each of which performs the data recording to the optical disc 109 or the data reproduction from the optical disc 109 being controlled by a CPU 102 of the data library device. Moreover, when the data recording/reproducing parts 110, 111, 112, and 113 each read the data recorded on the optical disc 109 at the time of the reproduction, they are capable of acquiring a, recording quality (for example, read quality) and are capable of transmitting it to the server 103 via the CPU 102. The read quality is information showing the recording quality of the already recorded data such as how much error correction processing is performed when being read.

107 is the optical disc conveying part, which takes out the optical disc 109 from the optical disc storing part 108 being controlled by the CPU 102 of the data library device 101, conveys it, and loads it into the data recording/reproducing parts 110, 111, 112, and 113. Alternatively, it receives the optical disc 109 from the data recording/reproducing parts 110, 111, 112, and 113, conveys it, and stores it in the optical disc storing part 108.

Moreover, the optical disc may be conveyed between the data recording/reproducing parts, for example, from the data recording/reproducing part 110 to the data recording/reproducing part 111, and the optical disc 109 may be conveyed inside the optical disc storing part 108. Moreover, in the case where the data library device 101 have multiple optical disc storing parts built in, the optical disc conveying part 107 may convey the optical disc from the built-in optical disc storing part to another built-in optical disc storing part.

102 is the CPU of the data library device 101, which controls the optical disc conveying part 107 according to a request from the server 103, selects a desired optical disc from the multiple optical discs 109 stored in the optical disc storing part 108, and sends it to the data recording/reproducing parts 110, 111, 112, and 113. Moreover, the CPU 102 controls the optical disc conveying part 107, receives the optical disc 109 from the data recording/reproducing parts 110, 111, 112, and 113, and stores the optical disc at a predetermined position in the optical disc storing part 108.

106 is memory, in which a program for controlling the CPU 102 of the data library device and various kinds of setting information are recorded.

Figure 2:
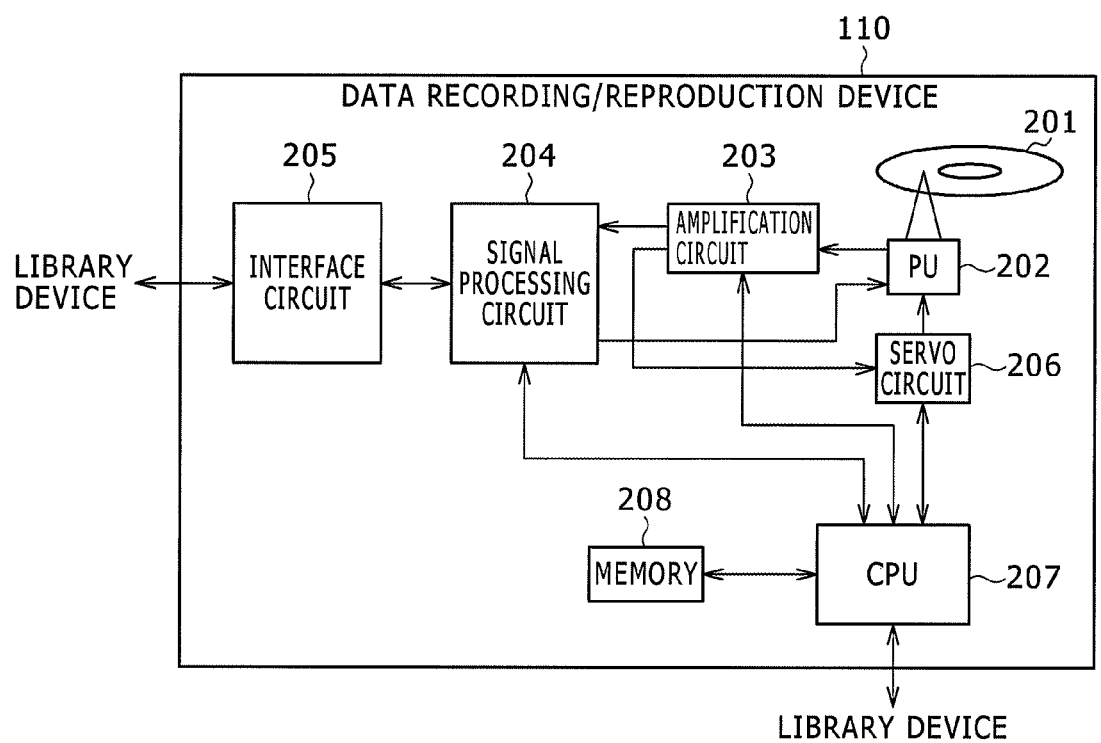
FIG. 2 is a block diagram showing a configuration of a data recording/reproducing part.

FIG. 2 is a block diagram showing a configuration of the data recording/reproducing part. 110 is the data recording/reproducing part, which records data inputted from the CPU 102 of the library device on the optical disc. Moreover, it outputs data reproduced from the optical disc to the CPU 102 of the library device.

207 is a CPU, which performs control of recording processing and reproduction processing of the data recording/reproducing part 110. Incidentally, an arbitrary circuit capable of the similar control other than the CPU may be used.

201 is a data recording medium, for example, BD (Blu-ray Disc). Moreover, the data recording medium is not necessarily limited to the optical disc, and may be a recording medium such as a magneto-optical disc and a hologram. 202 is an optical pickup, which reads a signal from the optical disc 201 and sends it to an amplifier circuit 203. Moreover, it records a modulation signal sent from a signal processing circuit 204 on the optical disc 201.

203 is the amplifier circuit, which amplifies a reproduced signal read from the optical disc 201 through the optical pickup 202, and sends it to the signal processing circuit 204. Moreover, it generates a servo signal and sends it to a servo circuit 206. 204 is the signal processing circuit, which demodulates an input signal and sends data that is subjected to error correction, etc. to an interface circuit 205. Moreover, it adds an error correction code to the data sent from the interface circuit 205 or does similar processing, and modulates and sends it to the optical pickup 202.

205 is the interface circuit, which performs data transfer processing, for example, conforming to SATA (Serial Advanced Technology Attachment) or other transfer systems. At the time of data transfer, it sends data sent from the signal processing circuit 204 to the CPU of the library device that is a host. Moreover, it sends the data sent from the CPU of the library device that is the host to the signal processing circuit 204.

208 is memory, which stores a program for controlling the data recording/reproducing part, various setting information, and medium information acquired from the optical disc, etc. Incidentally, although the example where the memory 208 was connected with the CPU 207 in the data recording/reproducing part was shown, the memory may be connected with anywhere inside or outside the data recording/reproducing part. Moreover, what stores the information may not be memory as long as it can hold information, for example, it may a hard disk drive. 206 is the servo circuit, which controls the optical pickup 202 with the servo signal generated in the amplifier circuit 203.

By the data recording/reproducing part of the above-mentioned configuration, data to the optical disc can be recorded according to an instruction from the CPU 102 of the data library device 101, and data can be reproduced from the optical disc and can be passed to the CPU 102 of the data library device 101. Incidentally, although the data recording/reproducing part 110 was explained here, the data recording/reproducing parts 111, 112, and 113 are also of the same configuration.

Figure 3:
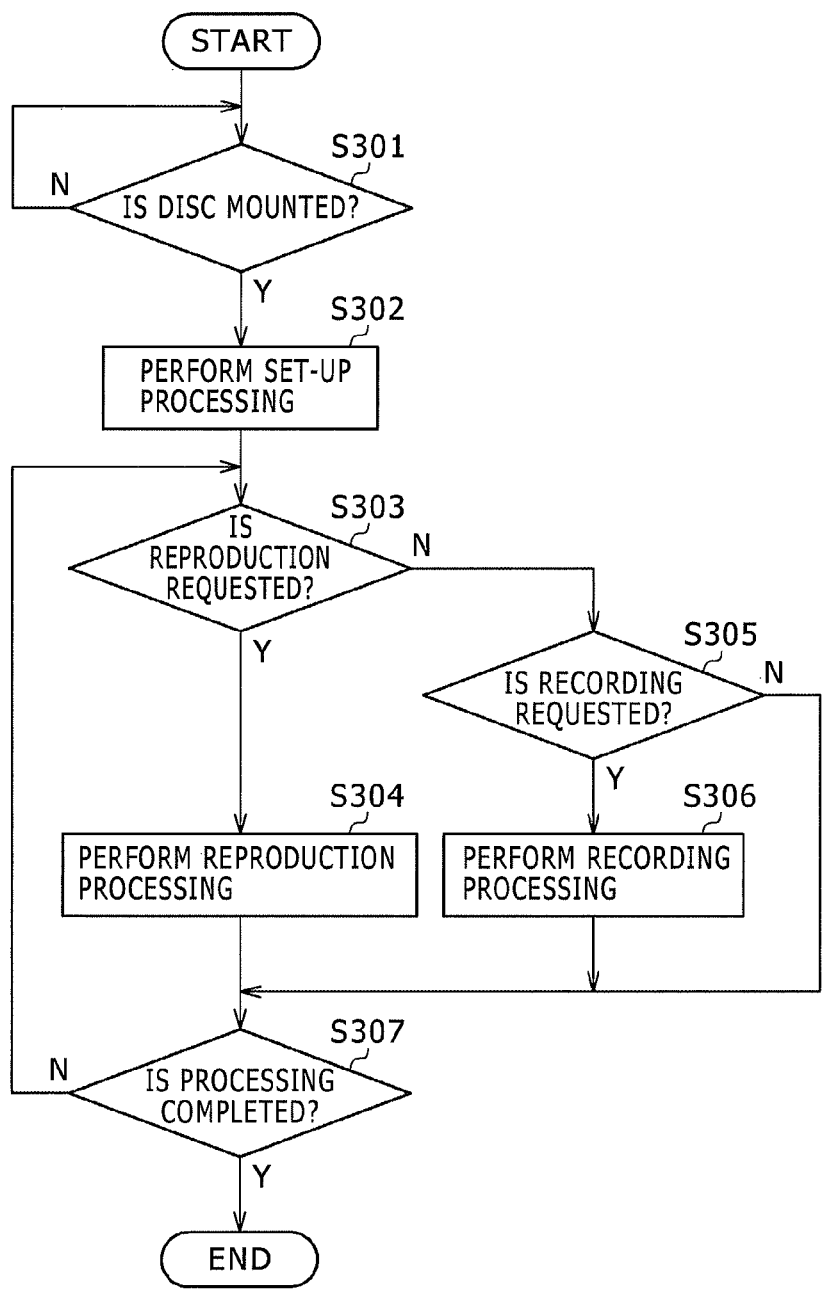
FIG. 3 is a flowchart showing an operation of the data recording/reproducing part.

FIG. 3 is a flowchart showing an operation of the data recording/reproducing part.

When the optical disc is mounted on the data recording/reproducing part in Step S301, setup processing is performed in Step S302.

Next, if the data reproduction is requested from the CPU of the data library device in Step S303, the data reproduction processing will be performed in Step S304. Alternatively, if the data recording is requested from the CPU of the data library device in Step S305, the data recording processing will be performed in Step S306. When the reproduction or recording processing is completed in Step S307, the processing is ended.

Figure 4:
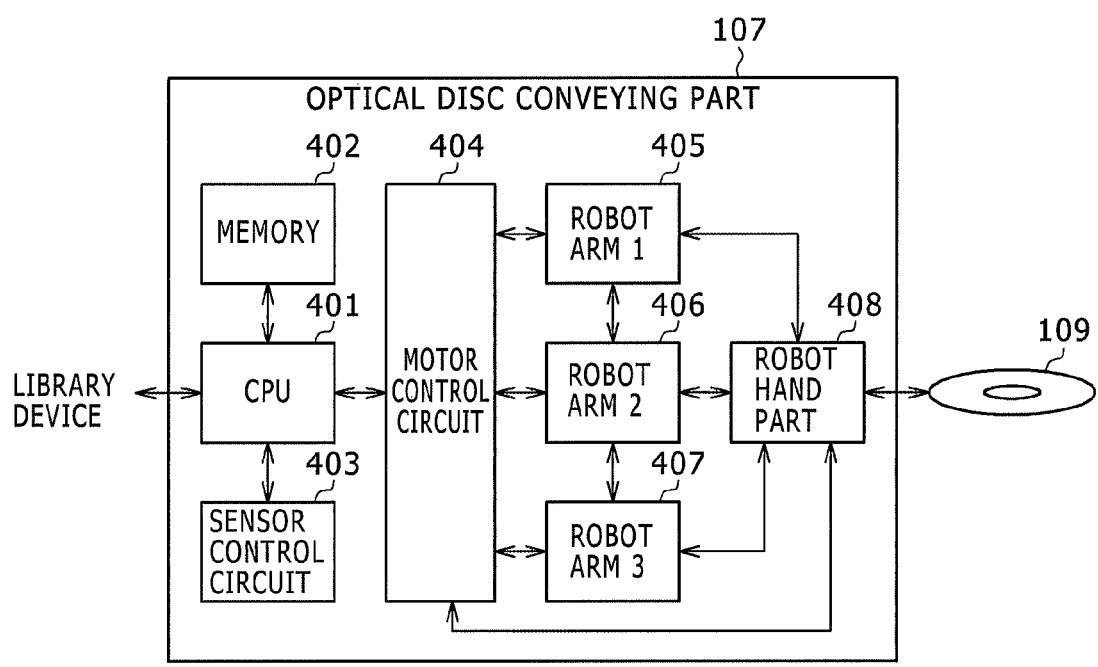
FIG. 4 is a block diagram of an optical disc conveying part.

FIG. 4 is a block diagram of the optical disc conveying part. 107 is the optical disc conveying part, which takes out the optical disc 109 from the optical disc storing part 108 in response to the instruction from the CPU 102 of the data library device 101, and loads it into the data recording/reproducing parts 110, 111, 112, and 113. Moreover, it takes out the optical disc from the data recording/reproducing part, and stores it in the optical disc storing part.

401 is a CPU, which controls the optical disc conveying part. 402 is memory, which stores a program for controlling the optical disc conveying part, various setting information, etc. Incidentally, although an example where the memory 402 was connected with the CPU 401 in the optical disc conveying part was shown, it may be connected with anywhere inside and outside the optical disc conveying part. Moreover, what stores information may be anything other than the memory as long as it can hold information and, for example, may be a hard disk drive.

403 is a sensor control circuit, which controls various sensors based on instructions from the CPU 401. Moreover, it receives input signals from the various sensors and notifies them to the CPU 401. 404 is a motor control circuit, which drives robot arm parts 405, 406, and 407 based on instructions from the CPU 401. Moreover, it drives a robot hand part 408.

The robot arm parts 405, 406, and 407 adjust a position of the robot hand part 408 with a translatory movement such as a forward movement and a backward movement and a rotational movement. The robot hand part 408 is comprised of a form capable of holding the optical disc 109 without damaging it, and performs taking in and out and delivering the optical disc into/from the optical disc storing part 108 and the data recording/reproducing parts 110, 111, 112, and 113.

The optical disc conveying part of the above-mentioned configuration enables the optical disc to be conveyed between the data recording/reproducing part and the data recording/reproducing part according to the instruction from the CPU 102 of the data library device 101.

Figure 5:
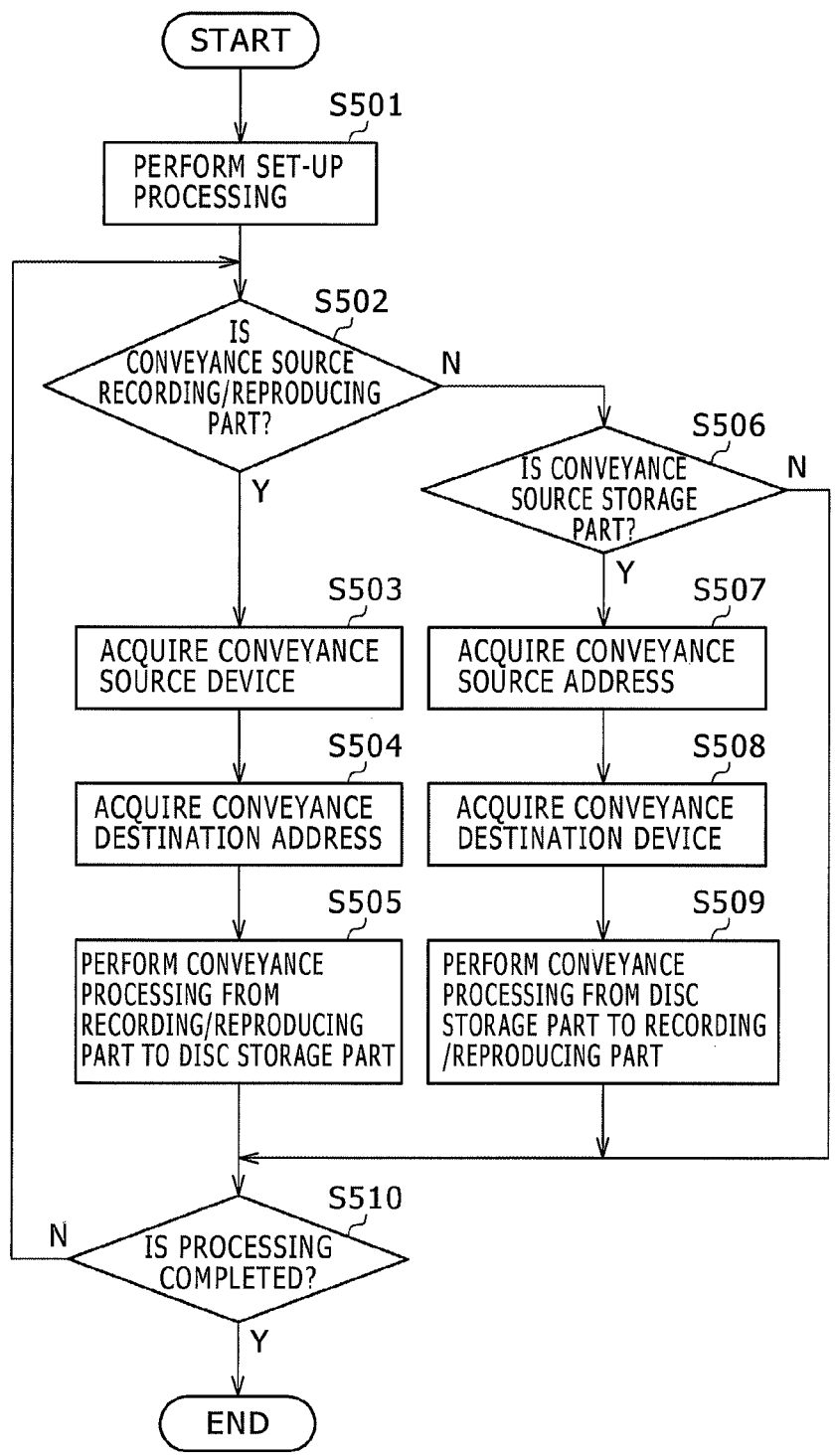
FIG. 5 is a flowchart showing an operation of the optical disc conveying part.

Incidentally, although the example where the single optical disc conveying part exists in the data library device was shown, it does not matter that multiple optical disc conveying parts may exist. FIG. 5 is a flowchart showing an operation of the optical disc conveying part. In Step S501, setup processing for starting an operation of the optical disc conveying part is performed.

Next, when the host assigns an optical disc conveyance source to the data recording/reproducing part in Step S502, information as to which one of the data recording/reproducing parts 110, 111, 112, and 113 was assigned is acquired in Step S503.

Next, information regarding to which address in the optical disc storing part the optical disc is conveyed and stored there is acquired in Step S504, the optical disc is received from the data recording/reproducing part that is a specified conveyance source in Step S505, and the received optical disc is conveyed to a predetermined address of the optical disc storing part that is a specified conveyance destination and is stored there.

Alternatively, when the host assigns a conveyance source of the optical disc to the optical disc storing part in Step S506, information regarding to which address in the optical disc storing part the optical disc is conveyed and stored there is acquired in Step S507.

Next, information regarding to which one of the data recording/reproducing parts 110, 111, 112, and 113 the optical disc is conveyed and transferred is acquired in Step S508, the optical disc is acquired at a predetermined address of the optical disc storing part that is a specified conveyance source in Step S509, and the acquired optical disc is conveyed to the data recording/reproducing part that is a specified conveyance destination.

When the processing is completed in Step S510, the processing is ended.

Figure 6:
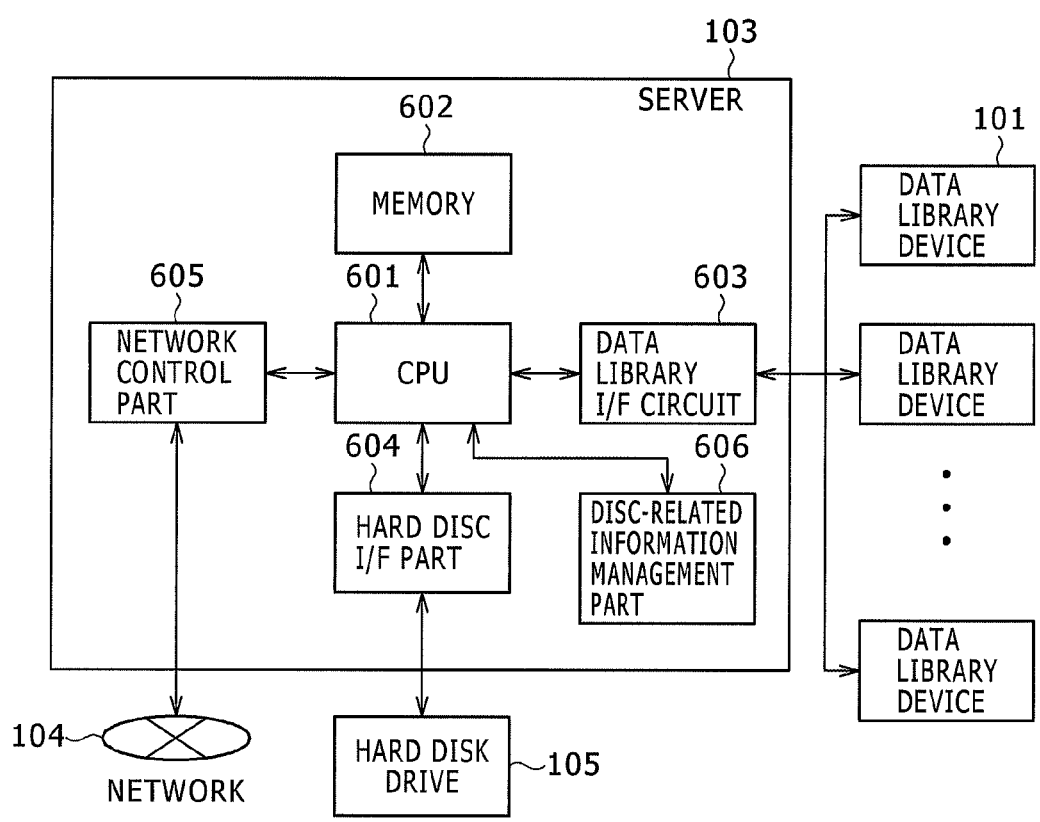
FIG. 6 is a block diagram showing a configuration of a server in a first embodiment.

FIG. 6 is a block diagram showing a configuration of a data archive. The data archive is comprised of one or more data library devices 101, the hard disk drive 105, and the network 104 connected to the server 103.

103 is the server, which provides service focusing on recording/reproduction of data to the data library device 101 and at the same time performs recording/reproduction of the data to the hard disk drive 105, transmission/reception and management of the data through the network 104.

601 is a CPU of the server 103 and records data received from the network 104 through a network control part 605 in the hard disk drive 105 through a hard disk I/F part 604 at the time of the data recording.

Alternatively, the CPU 601 controls the data library device 101 through a data library I/F part 603, and records on the optical disc that the data library device 101 has built in. At the time of the data reproduction, data is read from the hard disk drive 105 through the hard disk I/F part 604 and the read data is transmitted to the network 104 through the network control part 605.

Alternatively, the CPU 601 controls the data library device 101 through the data library I/F part 603, reproduces data from the optical disc that the data library device 101 has built in, receives the reproduced data, and transmits the received data to the network 104 through the network control part 605.

602 is memory, in which a program for controlling the CPU 601 of the server 103 and various kinds of information are recorded.

603 is the data library I/F part, which performs control about data transmission and reception between the data library device 101 and the CPU 601 of the server 103.

Incidentally, although multiple data library devices are connected to a single data library I/F part in the figure, a configuration in which multiple data library devices are connected through a network may be used, for example.

604 is the hard disk I/F part, which performs data transfer conforming to a standard such as SATA with the hard disk drive 105.

605 is the network control part, which performs control about data transmission and reception between the network 104 and the CPU 601 of the server 103.

606 is a disc-related information management part, which holds disc-related information acquired from the library device 101, etc., and searches the optical disc 109 that is related based on the disc-related information. Details of the disc-related information will be described later.

Figure 7:
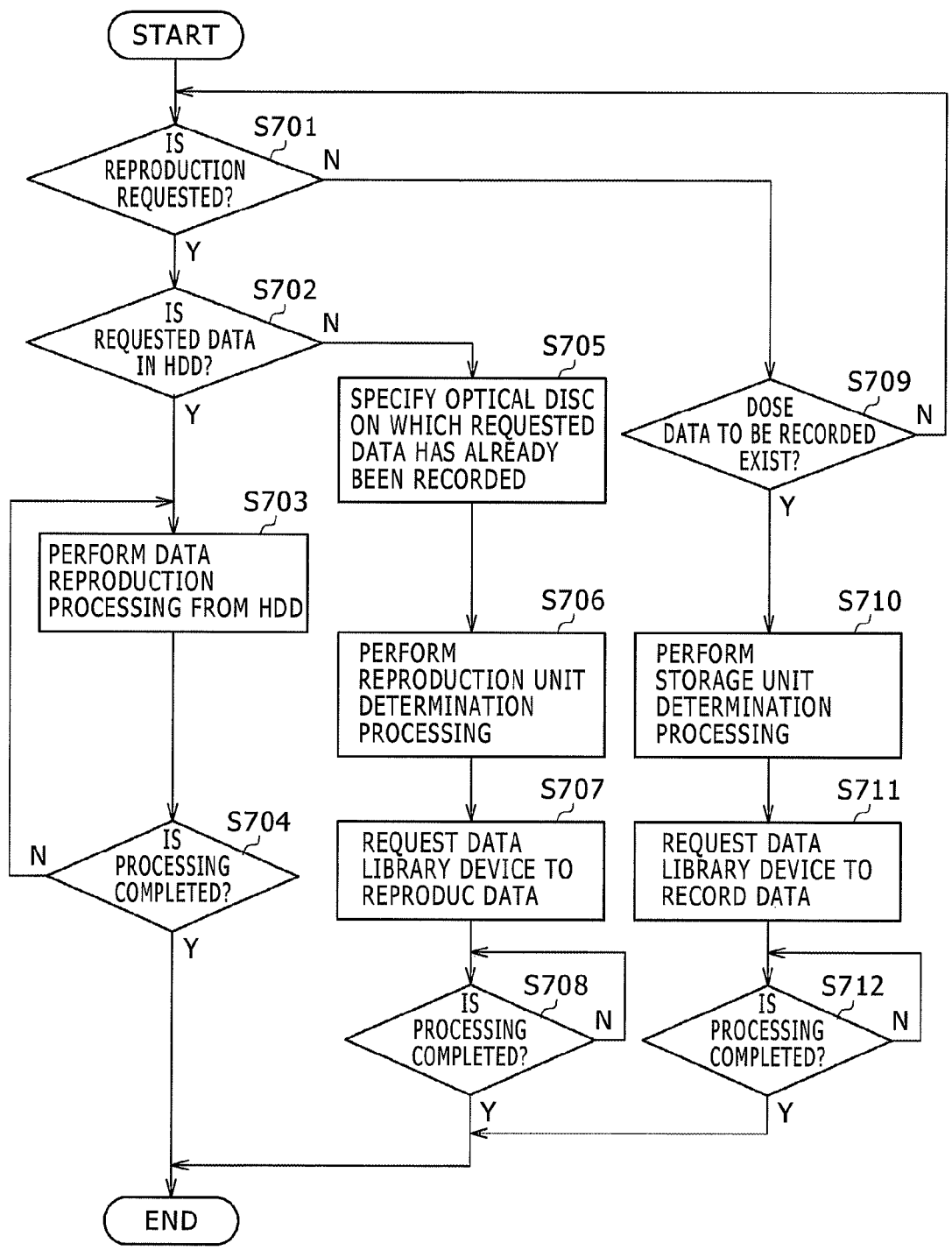
FIG. 7 is a flowchart sowing a recording/reproducing operation of a data archive.

FIG. 7 is a flowchart showing an operation of the data archive. When a reproduction request is given to the server 103 through the network 104 in Step S701, the CPU 601 of the server 103 investigates a storage destination of data that is requested to be reproduced in Step S702. If the requested data exists in the hard disk drive 105, the CPU 601 of the server 103 will perform the data reproduction processing from the hard disk drive 105 in Step S703. The reproduced data is transmitted to the network 104 through the network control part 605 from the CPU 601 of the server 103. Then, the reproduction processing is completed in Step S704.

Alternatively, if the requested data does not exist in the hard disk drive 105, the CPU 601 of the server 103 will specify the optical disc in which the data requested in Step S705 is recorded.

Next, reproducing unit determination processing is performed in Step S706. The reproducing unit determination processing is processing of determining which data recording/reproducing part of, which data library device is used in order to reproduce the optical disc. The program recorded in memory 602 of the server 103 performs this determination processing, and the determination algorithm similarly recorded in the memory 602 performs determination as to which device to use. When the data library device that is used for reproduction and the data recording/reproducing part that is used are decided by the reproducing unit determination processing, next in Step S707, the data recording/reproducing part that is used and the optical disc that should be reproduced are notified to the data library device decided in Step S706, and the data reproduction is requested. The reproduced data is sent to the CPU 601 of the server 103 from the data library device through the data library I/F part 603 at any time, and the CPU 601 transmits it to the network 104 through the network control part 605.

Next, when the processing is completed in Step S708, the processing is ended.

Moreover, the CPU 601 of the server 103 performs not only control of the reproduction processing but also control of the recording processing. Here, a case where a start trigger of the recording processing is made by a judgment of the CPU 601 of the server 103 in Step S709 will be explained in detail.

In Step S709, the CPU 601 of the server 103 investigates whether there is any data that should be recorded on the optical disc among pieces of data recorded in the hard disk drive 105. In other words, the data that should be recorded on the optical disc is data that should be moved from the hard disk drive 105 to the optical disc, or data that can be moved without causing any troubles.

Determination of whether to record each data on the optical disc is performed by a program recorded in the memory 602 of the server 103. In the determination, what is necessary is to use a criterion such that the data has not been given the reproduction request for a fixed period or more, as one example. When there is data that should be recorded, recording unit determination processing is performed in Step S710. The recording unit determination processing is processing of determining which data recording/reproducing part of which data library device and which optical disc should be used in order to record data on the optical disc. This determination processing is performed by a program recorded in the memory 602 of the server 103, and determination as to which device is used is performed by a determination algorithm recorded similarly in the memory 602.

When the data library device that is used for recording, the data recording/reproducing part that is used, and the optical disc that is used are decided by the recording unit determination processing, next in Step S711, the data recording/reproducing part to be used and the optical disc that should be used are notified to the data library device decided in Step S710, and the data that should be recorded is transferred and the data recording is requested.

Next, in Step S712, it is determined whether the processing has been performed.

By the above configuration, the data archive of this embodiment can reproduce the data from the hard disk drive in response to the reproduction request from the network.

In the present invention, a system having the above configuration is called a data archive system.

Next, one example of a disc quality inspection method will be explained. Disc quality inspection in the present invention means processing where periodically or at some opportunity, data showing the recording quality of the optical disc is acquired by an operation of the data recording/reproducing part and it is inspected whether quality deterioration has occurred. When the quality deterioration has occurred, for example, an error generation probability at the time of read increases, and a risk of becoming impossible to read data rises.

Determination of the quality deterioration is performed, for example, as follows: a numerical value, etc. such as an SER (Symbol Error Rate) is used, a threshold is set to the numerical value, and when a numerical value acquired by an inspection exceeds the threshold, it is determined that the optical disc is deteriorated.

When it is determined that the quality deterioration occurs in a certain optical disc, in order to continue storing data in the data library device, a method of avoiding a situation where it becomes impossible to read data by duplicating the data existing on the optical disc to another recording medium, etc. can be considered.

Figure 8:
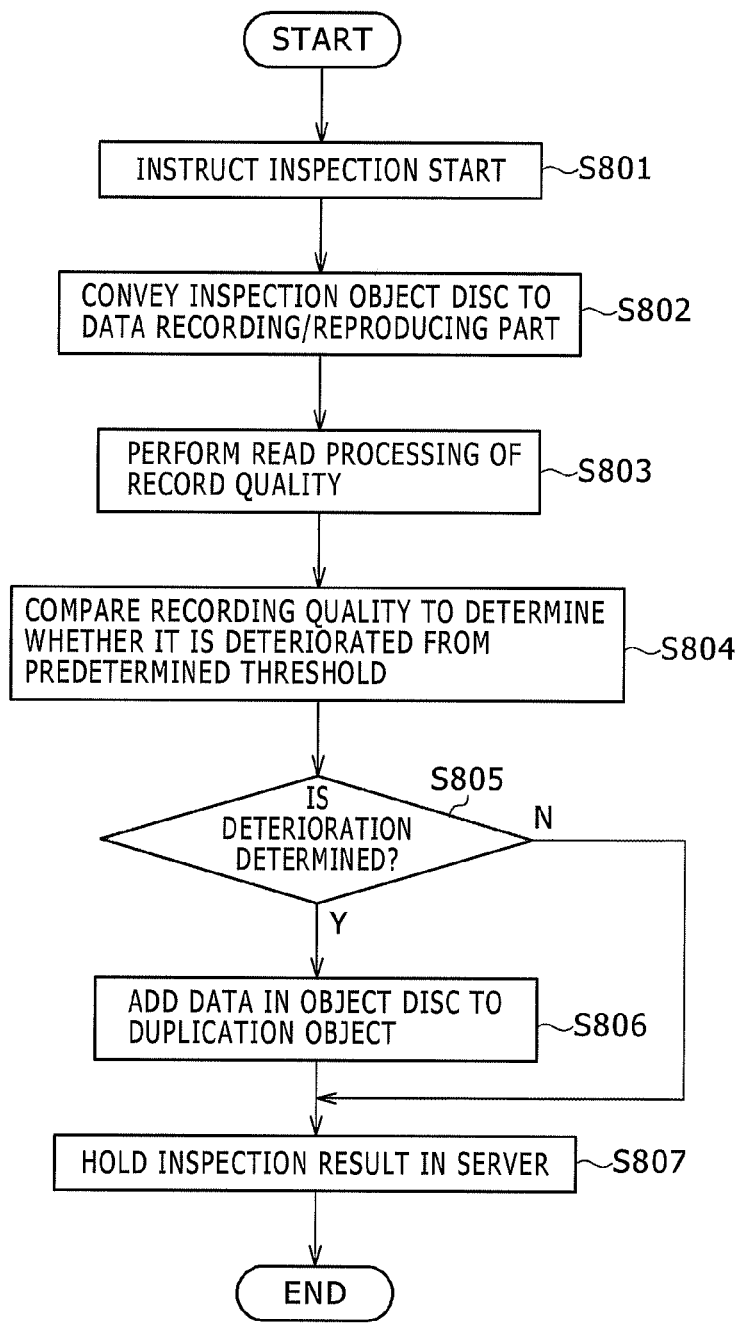
FIG. 8 is a flowchart showing one example of a quality inspection method of an optical disc.

FIG. 8 gives one example of a fundamental processing order of the disc quality inspection. This example shows a case where an inspection object is decided based on information of the optical disc in the data library device that the server holds for each predetermined period, and inspection of the read quality is conducted. The disc quality inspection shall be conducted for each of the data library devices, respectively, and the processing that will be explained henceforth will show a series of pieces of processing within one data library device.

In a periodical inspection opportunity, in S801, the server 103 instructs the data library device to start inspection of the optical disc that becomes the inspection object (hereinafter, written as an inspection object disc) via the data library I/F part 603.

Next, in S802, the inspection object disc is conveyed to the data recording/reproducing part. In the case where multiple data recording/reproducing parts exist, as a method for judging which data recording/reproducing part should be used, there can be cited, for example, a method for deciding it by assigning one among the data recording/reproducing parts that are not performing recording/reproduction according to a predetermined order, etc. Alternatively, a configuration in which the data recording/reproducing part exclusively for read quality acquisition processing is decided and is always used may be adopted. This case has a merit that even when recording other than duplication processing is regularly performed continually, the data recording/reproducing part is certainly available exclusively for inspection.

Next, in S803, the data recording/reproducing part performs read processing of the recording quality on the inspection object disc. Here, as one example, it is assumed that a value of the SER is obtainable as data showing the recording quality.

Then, in S804, comparison of the data with a threshold that the data library device or the server holds and serves as an "the recording quality on the inspection object disc" previously having been decided is performed. As the threshold, a value whereby the quality can be judged to be deteriorated may be set by a user arbitrarily or may be decided by other criterion. The threshold can be called by being recorded in memory 106 inside the data library device, etc.

When existence of the quality deterioration is determined and it is determined that there is no deterioration in S805, the flow shifts to S807, where an inspection result is recorded in memory of the server 103, etc., and the processing is ended. When the existence of the quality deterioration is judged, since it is considered that there is a risk that data read may become impossible, the flow shifts to S806, where the optical disc is set to be a duplication object. This setting is held, for example, in memory of the server, etc. Hereinafter, the optical disc whose recording quality is determined to be deteriorated by the disc quality inspection is written as a deteriorated disc. One example of concrete processing of data duplication will be described later. Next, the flow shifts to S807, where the inspection result is recorded, for example, in the memory of the server, etc. and the processing is ended. The disc quality inspection is conducted by the above.

As a result of the above-mentioned disc quality inspection, the deteriorated disc is registered as the duplication object.

Figure 9:
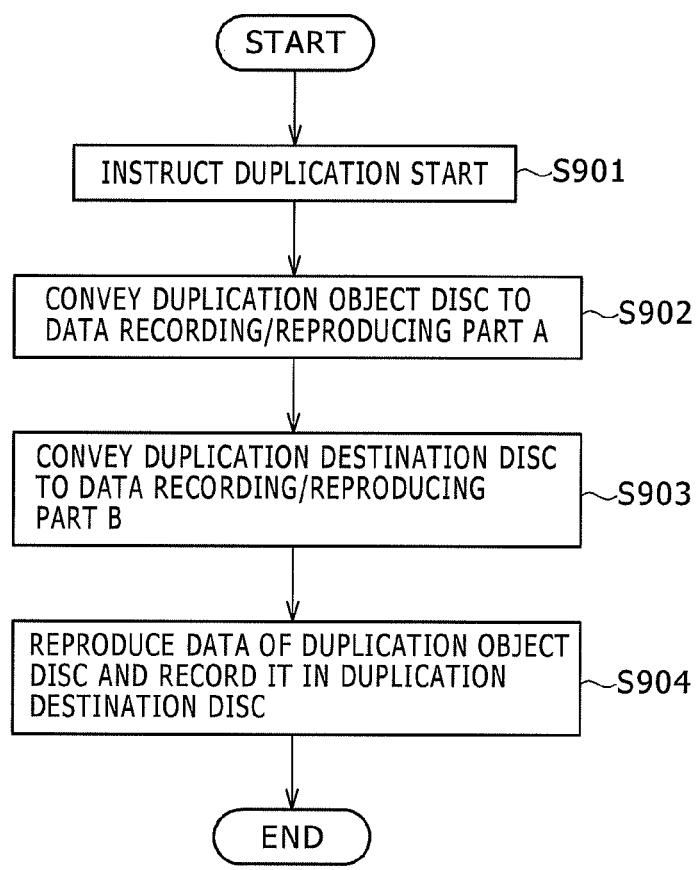
FIG. 9 is a flowchart showing one example of a duplication processing method of the optical disc.

FIG. 9 gives one example of a fundamental processing order of disc duplication processing. This example shows a case where processing of duplicating data on the optical disc that serves as an object of duplication (hereinafter, written as a duplication object disc) to another optical disc that serves as a duplication destination (hereinafter, written as a duplication destination disc) is performed in each predetermined period.

In S901, the server 103 instructs the data library device to start the duplication of the data in the duplication object disc via the data library I/F part 603.

Next, in S902, the duplication object disc is conveyed to the data recording/reproducing part A. At the time of the duplication processing, since the multiple data recording/reproducing parts are used, this data recording/reproducing device is named A for convenience, and is differentiated. Regarding a method for determining which one is used among the multiple data recording/reproducing parts, there can be cited a method whereby one data recording/reproducing part is decided, for example, by assigning it out of the data recording/reproducing parts that do not perform the recording/reproduction according to a predetermined order, etc. Alternatively, a configuration in which the data recording/reproducing part exclusively for the duplication processing is decided and is always used may be adopted. In this case, even when the recording other than the duplication processing is performed regularly continually, there is a merit that the data recording/reproducing part becomes certainly available as exclusively for the duplication processing.

Next, in S903, the duplication destination disc that serves as the duplication destination of the data is conveyed to the data recording/reproducing part B. This data recording/reproducing device is named B, and is differentiated. Incidentally, processing of S902 and S903 may be performed in a simultaneous parallel manner when the conveying mechanism is a mechanism capable of handling multiple optical discs. Doing so enables a time requested for the duplication processing to be shortened.

Next, in S904, data of the duplication object disc reproduced by the data recording/reproducing part A is recorded on the duplication destination disc in the data recording/reproducing part B. At this time, the data may be recorded while being buffered in memory in the data library device, etc. temporarily, or may be recorded while being transferred from the data recording/reproducing part A to the data recording/reproducing part B sequentially.

Even when the recording quality of the optical disc deteriorates, the data can be kept being held by performing the duplication. The duplication object disc in which the duplication processing has been completed is subjected to safe disposal, for example, by overwriting data that will make it impossible to read or doing the like.

When one deteriorated disc is found out by the disc quality inspection of the data library device, there is a possibility that other optical discs in the optical disc storing part inside the data library device are deteriorated in quality. From a viewpoint of reliability of data holding that is a requirement required for the data library device, it is desirable that before a situation where the data cannot be read happens, the optical disc whose quality is deteriorated is detected and data existing on that optical disc is duplicated to another recording medium, etc.

Moreover, there is a possibility that a factor of quality deterioration of the optical disc is not accidental, and may be dependent on environment, etc., if the user can grasp the factor and can improve it, it can be said that reliability improvement of, the system is more expectable. This embodiment has a method whereby, when the quality deterioration of the optical disc is detected, its factor is estimated and is made possible to be notified to the user by referring to information saved being associated with the optical disc.

First, the disc-related information will be explained. The disc-related information in the present invention is information held being associated with each optical disc, and the following pieces of information are handled, for example: an ID of the optical disc, a date and a time when the recording is initially performed, a date and a time when the recording is lastly performed, an ID of the data recording/reproducing device that performed recording and its history, a date and a time when the optical disc is stored in the data library device, a storage position of the optical disc storing part, a history of the recording quality index data in the previous inspection, etc. In addition to these, when pieces of data can be acquired from the various sensors, etc., for example, temperature, humidity, and a vibrational state, etc. and can be recorded being associated with a situation at the time of disc recording, they may be recorded as related information.

The disc-related information is held and managed by the disc-related information management part 606 of the server 103, for example. What is needed in the disc-related information is just to be in a format that can be searched, referred to, and updated: the format may be one file of a text format in which pieces of information are enumerated or may be a database having a relational database structure, which causes no problem in application to this embodiment.

FIG. 10 shows one example of the disc-related information.

Details of items of the disc-related information in this diagram will be explained. This diagram shows contents of the disc-related information that are associated with certain multiple optical discs, respectively. A disc ID is a number for uniquely specifying the optical disc and, for example, in the case of Blu-ray Disc, an ID that is uniquely assigned at the time of manufacture, etc. is used.

A storage date and time show a date and a time when this optical disc is stored in the data library device and holds values of the dater and the time. A recording start date and time shows a date and a time when the recording was initially performed on this optical disc, and holds values of the date and the time. A last recording date and time show a date and a time when the recording was lastly performed on this optical disc, and holds values of the date and the time. A drive history holds an ID of the data recording/reproducing part used for the recording, and when the multiple data recording/reproducing parts were used to perform the recording on this optical disc, the ID is postscripted with a predetermined number as an upper limit so that a history of the order that was used may remain. A storage position holds a value indicating at which position of the optical disc storing part inside the data library device the recording medium is stored, and is treated as position information that is associated with the storing place of the optical disc storing part. An inspection history holds a value that shows the recording quality acquired by the inspection executed until now, and when multiple times of inspection are conducted, the value is postscripted, for example, with a predetermined number as an upper limit so that the history may remain.

The disc-related information is updated by processing of the disc-related information management part in the server, for example, at the following timings: The disc ID is updated at a date and a time when the optical disc is stored in the data library device; the recording start date and time records a date and a time before the first recording is performed on this optical disc; the last recording date and time records a date and s time after the last recording is performed on this optical disc; the drive history postscripts a date and a time to a previous history at the time of ejection of the optical disc after the recording on the optical disc; the storage date and time is a date and a time when the optical disc is stored in the data library device and is registered in a database held in the server; the storage position is a date and a time when the optical disc is stored in the data library device and is registered in the database held in the server after conveyance of the optical disc; the inspection history is written after end of the inspection of this optical disc; and the like.

Figure 11:
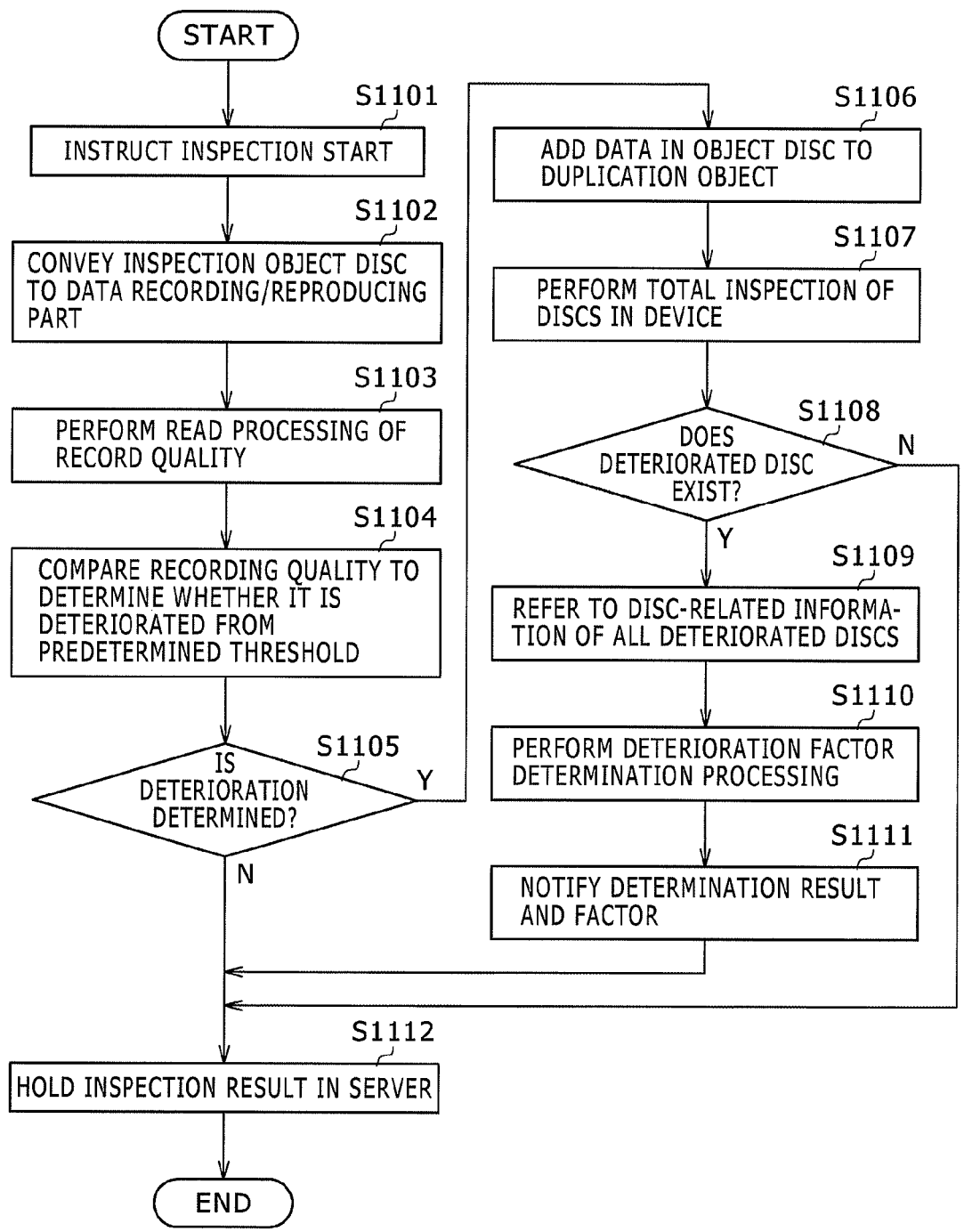
FIG. 11 is a flowchart showing contents of processing of the first embodiment.

One example of a processing order of the disc quality inspection in this embodiment will be given in FIG. 11. This example shows a case where the inspection object is decided based on information on the optical disc in the data library device that the server holds for each predetermined period, and the recording quality inspection (for example, read quality, etc.) is conducted. Incidentally, since steps S1101 to S1104 are the same processing as that of steps S801 to S804 in FIG. 8 described above, their explanations are omitted.

When the existence of the quality deterioration is determined and it is determined that there is no deterioration in S1105, the flow shifts to S1112, where the inspection result is recorded, for example, in the memory of the server, etc., and the processing is ended. When it is judged that there is the quality deterioration in S1105, since it is considered that there is a risk that data read may become impossible, the flow shifts to S1106, where the optical disc is set as the duplication object disc. This setting is held in the memory of the server, etc.

Next, the flow shifts to S1107, where the quality inspection is conducted on all the optical discs that can be the inspection objects existing in the data library device. All the optical discs that can apply to the inspection objects spoken here indicate all the optical discs in the data library device, a case where periodical inspection is performed at regular intervals, and also a case where all the optical discs that are uninspected in a certain round. This quality inspection is executed, for example, by a Sequence shown in FIG. 8. That is, when the deteriorated disc is detected in the inspection in this S1107, it is registered as a candidate for the duplication, respectively, and the disc ID is held in the memory of the server, etc.

In S1108, it is determined whether the deteriorated disc is detected as a result of optical disc total inspection, and when the deteriorated disc exists, the flow shifts to S1109, where the disc-related information is referred to. At this occasion, a referencing operation is performed, for example, using the disc ID as a key. When multiple deteriorated discs have been detected, the disc-related information is referred to for each of them. Referring to the disc-related information is performed by the disc-related information management part of the server 103, and when the related information of all the deteriorated discs is read, the flow shifts to S1110. When the deteriorated disc other than this has not been detected in S1108, the processing is ended. In this case, the deterioration factor cannot be specified and it shall be treated as accidental deterioration.

In S1110, the deteriorated discs are compared from values of respective items of the related information read by the disc-related information management part, and a quality deterioration factor is determined. Details of the comparison and a determination method will be described later. Next, in S1111, a determination result acquired in S1110 and information considered to be the factor are notified to the user. Details of a notification method will be described later.

After the above processing, in S1112, processing of saving the inspection result in the server as the disc-related information is performed and the processing is ended.

Incidentally, when there are the multiple data recording/reproducing parts and the optical disc conveying part is configured to handle multiple optical discs, since the disc quality inspection and the data recording/reproduction processing can be performed in a simultaneous parallel manner, data duplication processing of the duplication object disc as shown in FIG. 9 may be performed in parallel with processing of S1107 to S1112 after the deteriorated disc is added to the duplication object in the above-mentioned S1106. Doing this may produce a possibility that a time requested for all pieces of processing can be shortened.

Next, details of the comparison and an example of the determination method in S1110 will be explained. This processing is to determine whether there is any element that acts as the quality deterioration factor from related information of the deteriorated disc.

As an example of a first factor, it is determined whether there is any deterioration factor related to a recording time. This is done by comparing the recording start date and time and the last recording date and time of the disc-related information. First, the recording start date and time among the related information of the deteriorated disc is put in comparison, and when all of them has the same value or differences in a range that can be determined to be the same time within a predetermined range, it is estimated that the recording start date and time and the quality deterioration have an association with each other and it is determined that there was the quality deterioration factor depending on time. The last recording date and time is determined similarly.

Moreover, also when a period between the recording start date and time to the last recording date and time of a deterioration disc overlaps those of another deterioration disc, it is determined that there was the quality deterioration factor in the overlap period. The quality deterioration factor depending on these times includes a case where when the recording is performed in a situation where vibration is temporarily large due to, for example, an earthquake and the quality at the time of recording is not so excellent, and it is determined that there was a possibility that such disks were determined as the deteriorated discs in the same period.

In addition to this, existence of the time dependent factor such as a situation where an ambient temperature of the data library device varied temporarily can be extracted. This factor gives a possibility that further cause unfolding may be able to be attained by comparing it with information obtained from other sensors (data of a vibration meter and a thermometer at that time in the above-mentioned example).

At this time, as an example of a message that is notified to the user, there can be cited "Deterioration of multiple optical discs recorded during around 9:20 to 12:44 on 16 Sep. 2012 was detected. There is a possibility that a phenomenon becoming the recording quality deterioration factor may have occurred at that time." etc. Together with this, it may be good to notify a message proposing the user to aim at improvement as follows, for example: "It is recommended to collate with information of the data library device installation environment at that time, for example, data of an ambient temperature, a vibrational situation, etc. and to execute inquiry into the cause and its countermeasure." and the like. This case has a merit that an action that the user should take after this is easy to understand.

As an example of a second factor, it is determined whether there is any deterioration factor related to the data recording/reproducing part. This is done by comparison of the drive history of the disc-related information. First, the drive history among the related information of the deteriorated disc is put in comparison, and when all of them are an identical value, it is estimated that the optical disc that was recorded by a specific data recording/reproducing part (drive) has become deteriorated at the inspection time, and it is determined that there was the quality deterioration factor depending on the data recording/reproducing part.

Alternatively, since all pieces of data on one optical disc are not necessarily recorded by the same data recording/reproducing part and they are held in the disc-related information as a history, either of the followings may be decided by the user arbitrarily: if the optical disc has been recorded in the data recording/reproducing part even once, it is set as a comparison object; or only a case where all pieces of data on the optical disc are recorded by the same data recording/reproducing part is designated as an object. When it is estimated that the deterioration factor exists in a specific data recording/reproducing device, there is a possibility that it can be improved by checking whether the data recording/reproducing part itself is normal, etc., for example, by inserting the optical disc on which data for inspection was recorded into the data recording/reproducing part and checking the read quality.

At this time, as an example of a message notified to the user, it is cited that "Deterioration of multiple optical discs recorded by a drive B of the data library device is detected. There is a possibility that the drive B has a failure or is deteriorated in performance." etc. Together with this, a message proposing to aim at an improvement, for example: "It is recommended to execute calibration or change of the drive." etc. may be notified to the user. This case has a merit that an action that the user should take after this is easy to understand.

As an example of a third factor, it is determined whether there is any deterioration factor related to a time when the optical disc is stored in the data library device. This is done by comparison of the storage date and time of the disc-related information. First, the storage date and time among the related information of the deteriorated disc is put in comparison, and when they all have the same value or differences in a range that can be determined to be the same time within a predetermined range, it is estimated that the storage date and time and the quality deterioration have an association with each other, and it is determined there was the quality deterioration factor depending on a storage time and handling at the time of storing. This case suggests that a storage method by which the optical discs are stored at the same period, a conveyance method, etc. have an association, and therefore there is a possibility of clarifying a factor from work records at that time, etc.

As an example of a message that is notified to the user, there can be cited: "Deteriorations of multiple optical discs stored in the data library device on 14 Sep. 2012 are detected. There is a possibility that optical discs stored at that time may be affected by a phenomenon that becomes the recording quality deterioration factor." and the like. Together with this, a message of proposing to aim at an improvement, for example: "It is recommended to collate with the work records, etc. such as a storage situation and a conveyance situation of the optical discs that were stored at that time, and to execute inquiry into the cause and its countermeasure." etc. may be notified to the user. This case has a merit that an action that the user should take after this is easy to understand.

As an example of a fourth factor, it is determined whether there is any deterioration factor related to the storage position of the optical disc storing part in the data library device. This is done by comparison of the storage position of the disc-related information. First, the storage position among the related information of the deteriorated disc is put in comparison, and when the deteriorated discs are stored at adjacent positions or when they are stored in a predetermined range, it is estimated that the storage position and the quality deterioration have an association with each other, and it is determined that there was the quality deterioration factor depending on the storage position.

This case indicates that there is a factor whereby only a region at a specific storage position exists, for example, by residence of heat, etc., and by executing a countermeasure of examining its improvement, storing it while avoiding that region at the storage position, etc., there is a possibility that it becomes possible to avoid a situation of easily becoming the deteriorated disc.

At this time, as an example of a message that is notified to the user, there is given: "Deteriorations of multiple optical discs stored in the periphery of a storage destination L026 in the data library device are detected. There is a possibility that the optical discs stored at the position may be affected by a phenomenon that becomes the recording quality deterioration factor." etc. Together with this, a message of proposing to aim at an improvement, for example: "It is recommended that inquiry into the cause of the recording quality deterioration to the optical disc stored in the vicinity at the position and its countermeasure be performed or an operation be changed to one that does not store the disc at that position." etc. may be notified to the user. This case has a merit that an action that the user should take after this is easy to understand.

As an example of a fifth factor, it is determined whether there is a deterioration factor related to the disc ID. For example, in the case where a unique ID number given by an optical disc manufacturer is used as the disc ID and information such as a lot at the time of manufacture and the manufacturer can be referred to from the ID number separately, a case where a pace of the deterioration of the optical disc of a specific lot or a specific maker is the same (where the deterioration is rapid especially as compared with other lots and other makers) can be detected. This is a case where the disc IDs of the deteriorated discs are collated with separately prepared information that shows association of a production lot and the manufacturer, and when the information is determined to be a numerical indicating that the discs belong to the same production lot or the same manufacturer, it is determined that there is the quality deterioration factor depending on the production lot or the manufacturer.

At this time, as an example of a message that is notified to the user, there is cited: "Deteriorations of multiple optical discs of a specific production lot (or manufacturer) are detected. There is a possibility that the optical discs of the production lot (or manufacturer) become easily deteriorate in the recording quality at the present moment." etc. Together with this, a message of proposing to aim at improvement, for example, "It is recommended that optical discs having not become the deteriorated discs of the same manufacture lot (or by the manufacturer) be also checked for the inspection results, and if the recording quality is not excellent, the data duplication shall be performed as soon as possible." etc. This case has a merit that an action that the user should take after this is easy to understand.

A condition that is judged to have an association by these indices is notified to the user as the quality deterioration factor. As the notification method, there is a method whereby the notification is displayed as a message on a display of a terminal connected to the server, for example, by an operation of software for managing the data library device operating on the server. Alternatively, there is a method whereby the notification is made referable through a unit of network communication that is realized by a protocol such as an HTTP (Hyper Text Transfer Protocol) from the user's computer connected by the network. Alternatively, if the server can use a mail server, it is done by transmitting a notification mail to the user's mail address that has been registered in advance. Since notification of the quality inspection of the optical disc is executed for each data library device in this example, it is desirable that a unique ID or name is set so that the user can recognize which one is the user library device that has made notification and the server is configured so as to display the unique ID or name with notification of the quality inspection of the optical disc.

Moreover, these conditions may be applied as a single condition, respectively, or multiple conditions may be applied in an arbitrary application order, or the user may set a condition and an application order that are considered empirically appropriate. Processing whereby the system makes an automatic selection so that what is estimated as the quality deterioration factor at the time of previous disc inspection may be applied preferentially, etc. may be performed. In such a case, a range of determination accuracy matching with the user's desire can be set for each of them, and the similar effect can be expected in that range.

Moreover, the deterioration factor of all the optical discs do not necessarily need to be the same regarding one condition, and when not the whole number but a part of the deteriorated discs satisfy the same condition, it may be set so that the optical discs are determined to have the deterioration factor, for example, when it is determined that a half of the deteriorated discs agree with the condition as given in the above, the condition is notified as the deterioration factor, and the like.

Moreover, when the deteriorated discs agree with multiple conditions each of which serves as a deterioration factor, each factor may be notified or one condition whose number of agreements is the largest may be notified. It is desirable that these can be arbitrarily decided by the user setting, etc.

In the above-mentioned example, although management (including holding) of the related information is performed by the disc-related information management part 606 that the server 103 has in its inside, a configuration in which the data library device has the disc-related information management part 606 may be used, or saving of the related information may be performed, for example, with a recording medium (optical disc) that the data library device handles. In this case, with a configuration, for example, that enables the optical disc storing device to be taken out from the data library device and to be loaded to another data library device, the related information can be shifted easily, that is, this case has a merit in a case where it is effective to hold the related information being associated with the optical disc storing device.

Second Embodiment

For example, when the deteriorated disc is detected by periodical disc quality inspection, a possibility that optical discs related to it may have become the deteriorated disc similarly can be considered. This embodiment explains an efficient method for finding out such an optical disc at an early stage.

Although the server 103 in this embodiment is fundamentally of the same configuration as that of FIG. 6, in addition to it, it has an inspection object management part (not illustrated). The inspection object management part is holding an order of the optical discs to be inspected as a list and the server executes the inspection according to the order. The list that this inspection object management part holds is data of a format capable of being searched, referred to, and updated.

In the disc quality inspection in this embodiment, the inspection object disc is decided according to an inspection order list that an inspection object management part 1301 and the inspection is executed sequentially. At that occasion, when the deteriorated disc is detected, it is considered that other optical discs having the same related information may have become deteriorated discs, an inquiry is made to the disc-related information management part in the server, and optical discs each having an item whose value is the same value as that of the detected deteriorated disc out of items of the disc-related information are searched.

"The same value" spoken here shall indicate a case where each of the values is the same value or a case where they are values whose difference is within a range of a predetermined threshold. When there is an optical disc with an item whose value becomes the same value, it shall be designated as the optical disc having an association with the deteriorated disc (hereinafter, mentioned as a pertinent disc).

Since there is a possibility that the pertinent disc has become the deteriorated disc, the inspection object management part sets it to a next inspection object so that its quality may be inspected preferentially and the duplication processing may be performed immediately. That is, the inspection object management part dynamically changes or updates the inspection order list that describes the inspection object discs.

Figure 12:
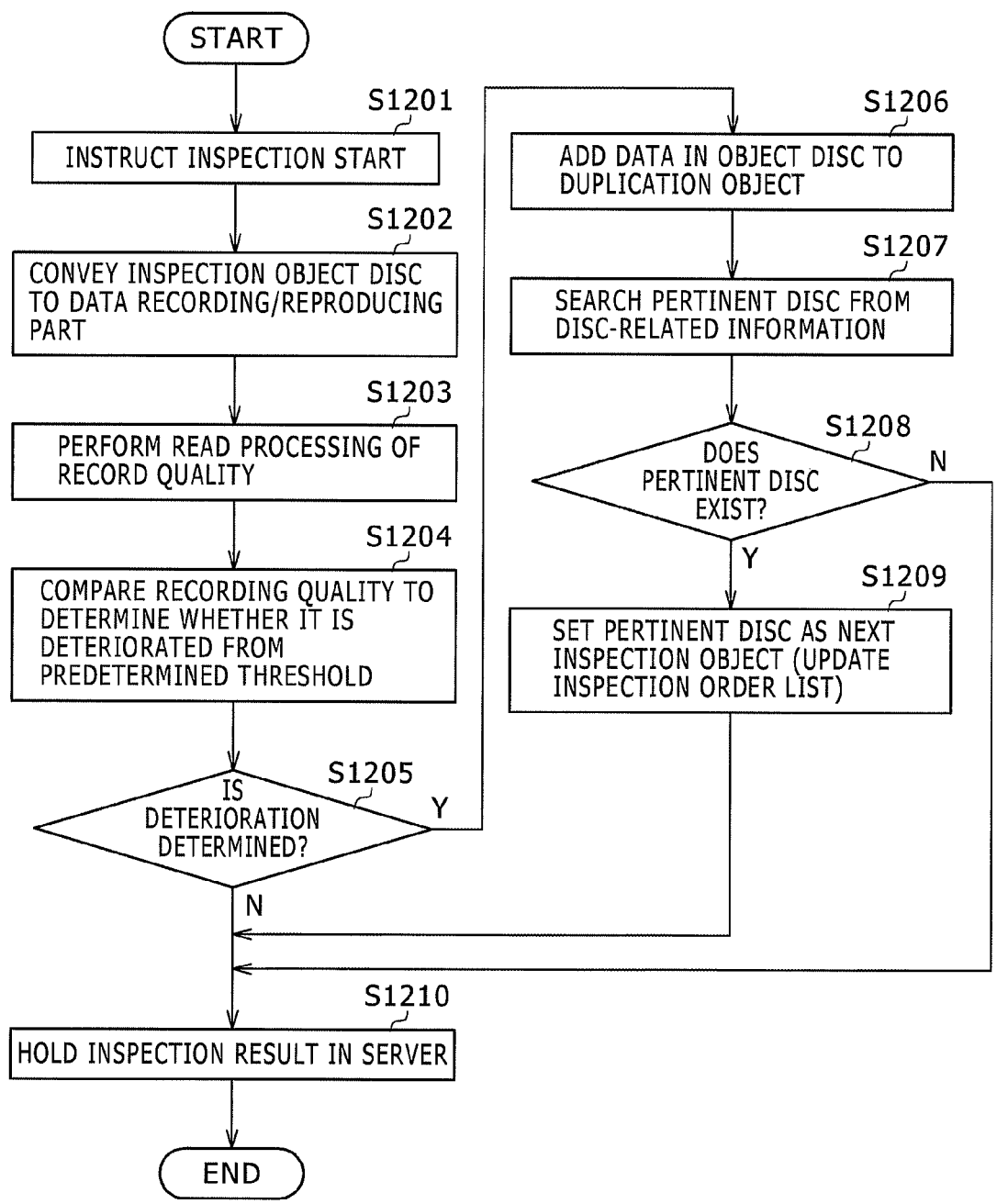
FIG. 12 is a flowchart showing contents of processing of a second embodiment.

FIG. 12 shows one example of a sequence of a case where the inspection order list is dynamically changed. Incidentally, since steps S1201 to S1204 are the same processing as that of steps S801 to S804 in FIG. 8 described above, their explanations are omitted.

In S1205, the existence of the quality deterioration is determined, and when it is determined that the optical disc has no deterioration, the flow shifts to S1210, where the inspection result is recorded, for example, in the memory of the server, etc., and the processing is ended. When it is judged that the optical disc has the quality deterioration, since it is considered that there is a risk that data read may become impossible, the flow shifts to S1106, where the optical disc is set as the duplication object. This setting is held in the memory of the server, etc.

Next, the flow shifts to S1207, where the pertinent disc is searched. Search of the pertinent disc is performed by the disc-related information management part 606. Details of the pertinent disc search processing will be described later.

In S1208, as a result of the pertinent disc search in S1207, existence of the pertinent disc is determined, and when the pertinent disc exists, the flow shifts to S1209, where the inspection order list is updated so that the pertinent disc may be assigned as the next inspection object. When multiple pertinent discs exist, the inspection order list is updated so that the discs are put in an inspection order according to an output order of the pertinent disc search processing result in S1207. After the updating is ended, the flow shifts to S1210. When the pertinent disc is not specified in S1208, the flow shifts to S1210. In this case, the inspection order shall not be changed and the inspection shall be executed in an order of the original inspection order list after this.

In S1210, processing of saving the inspection result as the disc-related information, for example, in the disc-related information management part 606 of the server is performed, and the processing is ended.

About the method for searching the pertinent disc, a concrete example will be shown below.

As a first example, the pertinent disc is searched based on the recording time. This is a search condition in which it is assumed that an initially detected deteriorated disc fall in a case where it is recorded in a situation when vibration is temporarily large by the quality deterioration factor depending on time, for example, an earthquake, and the quality at the time of recording is not so excellent, it is determined that the pertinent disc recorded at the same period has a high probability of being the deteriorated disc, and it is designated as the next inspection object.

The search is performed by comparison of the recording start date and time and the last recording date and time of the disc-related information. First, the recording start date and time among the related information of the deteriorated disc is extracted, and other optical discs each of which has the same value as it or a difference in a range that can be determined to be the same time within a predetermined range are searched. The last recording date and time is also searched similarly. Moreover, the optical discs whose periods of the recording start date and time to the last recording date and time overlap are also searched. When there are multiple optical discs that are applicable, for example, an optical disc whose recording start date and time and/or last recording date and time are closer is given priority. Alternatively, a criterion that a pair of optical discs whose overlap of the period of the recording start date and time to the last recording date and time is large is given priority has been established by the user or the system in advance, and the inspection order is decided according to it.

As a second example, the pertinent disc is searched based on the ID of the data recording/reproducing part that performed the recording. This is a search condition in which it is assumed that an initially detected deteriorated disc falls in a case where its quality at the time of recording is not so excellent because of the quality deterioration factor depending on the data recording/reproducing device that performed the recording, it is presumed that the pertinent disc recorded by the same data recording/reproducing part has a high possibility of being the deteriorated disc, and it is designated as the next inspection object.

The search is performed by comparison of the recording start date and time and the last recording date and time of the disc-related information. First, the drive history among the related information of the deteriorated disc is put in comparison and optical discs each having the same value, i.e., other optical discs that are recorded by the same data recording/reproducing part (drive) are searched.

As a third example, the pertinent disc is searched based on a time when the disc is stored in the data library device. This is a search condition in which it is assumed that an initially detected deteriorated disc is affected by the quality deterioration factor depending on treatment of the optical disc at the time of being stored in the data library device, for example, because of a fact that the storage method or the conveyance method is the same, it is presumed that the disc stored at the same time has a high possibility of being the deteriorated disc, and it is designated as the next inspection object.

The search is performed by comparison of the storage date and time of the disc-related information. First, the storage date and time among the related information of the deteriorated disc is extracted, and other optical discs each of which has the same value as it or a difference value in a range that can be determined to be the same time within a predetermined range are searched. When there are multiple optical discs that are applicable, for example, a criterion of giving priority to one whose storage date and time is closer, etc. has been established by the user or the system in advance, and the inspection order is decided according to it.

As a fourth example, the pertinent disc is searched based on the storage position in the data library device. This is a search condition in which it is assumed that the initially detected deteriorated disc has the quality deterioration factor depending on the storage position of the data library device, for example, a factor that makes only a region at a specific storage position deteriorate because of, for example, residence of heat, it is presumed that the pertinent disc stored in its vicinity has a high possibility of being the deteriorated disc, and it is designated as the next inspection object.

The search is performed by comparison of the storage position of the disc-related information. First, the storage position among the related information of the deteriorated disc is extracted, and other optical discs each of which has a value adjacent to it or a difference value in a range that can be determined to be in the vicinity within a predetermined range are searched. When there are multiple optical discs that are applicable, for example, a criterion of giving priority to one whose storage distance is near, etc. has been established by the user or the system in advance, and the inspection order is decided according to it.

As a fifth example, the pertinent disc is searched based on the inspection history obtained so far. This is done to the optical disc on which multiple times of inspection have been performed until this time inspection and that is determined so far not to be the deteriorated disc. This is a search condition in which it is presumed that the optical disc has the same deterioration tendency as that of the initially detected deteriorated disc, that is, the pertinent disc whose rate of change of the index value showing the recording quality in Storage History is the same has a high possibility of being the deteriorated disc, and it is designated as the next inspection object.

Search is performed by finding an approximate expression representing a rate of change from the inspection history of the disc-related information and performing its comparison. First, the inspection history of the related information of the deteriorated disc is extracted, when there are multiple histories, an approximate expression is found from transition of values, and another optical disc having the same approximate expression as that thereof or another optical disc having the same rate of change is searched. When there are multiple optical discs that are applicable, a criterion, for example, such as one whose rate of change is near is given priority is decided in advance by the user or the system, and the inspection order is decided according to it.

These search conditions may be applied as a single condition, or multiple search conditions may be applied in an arbitrary priority order. This means the following: the user may arbitrarily sets a search condition and an application priority order that are considered reasonable empirically, or the system may perform processing of automatic selection so that a condition that had a frequently corresponding item at the time of previous search may be applied preferentially, etc. Moreover, when applying multiple search conditions, any possible search methods may be applied as its search order such as a depth first search (search is performed by giving priority to one certain condition) and a width priority search (search is performed based on as many conditions as possible). Making them arbitrarily settable has a merit that it becomes possible to set the inspection object based on a determination accuracy that the user requests.

Moreover, when the deteriorated disc is detected, the optical disc that was determined not to be the deteriorated disc in the quality inspection executed before in the same round as that case may be excluded from the inspection object at the time of the pertinent disc search. In this case, it is possible to execute the pertinent disc search more efficiently.

Moreover, a first embodiment and a second embodiment may be performed in combination. When the deteriorated disc is detected by the first embodiment, it is possible to execute the total inspection so that its inspection order may be based on the second embodiment. Doing in this way makes compatible execution of presumption of the quality deterioration factor of the first embodiment and detecting the deteriorated disc efficiently.

Incidentally, the present invention is not limited to the above-mentioned embodiments, and includes various modifications. For example, the above-mentioned embodiments were explained in detail in order to explain the present invention plainly, and embodiments are not necessarily limited to ones that have all the configurations having been explained. Moreover, it is also possible to replace a part of a configuration of a certain embodiment with a configuration of another embodiment, and also to add a configuration of another embodiment to the embodiment of the certain embodiment. Moreover, it is possible to subject a part of the configuration of each embedment to addition, deletion, and replacement of another configuration. Moreover, a part or the whole of each of the above-mentioned configurations, functions, processing parts, processing units, etc. may be realized by hardware, for example, by designing it with an integrated circuit, etc. Moreover, the above-mentioned configurations, functions, etc. may be realized by software by a processor interpreting and executing a program for realizing each function. Information of a program, a table, a file, etc. that realize respective functions can be placed on a recording device such as memory, a hard disk drive, and an SSD (Solid State Drive), or a recording medium such as an IC card, an SD card, and DVD. Moreover, control lines and information lines that are considered necessary for explanation are shown and all the control lines and information lines on products are not necessarily shown. In fact, it may be considered that almost all the configurations are, connected mutually.

What is claimed is:

1. A data archive system with a server and a data library device,
wherein;
the server comprising:
a control unit that controls the data archive system;
a data library I/F unit for communicating with the data library device; and
an information storing medium for storing disc-related information associated with each optical disc that is stored in the data library device;
the data library device comprising:
a plurality of the optical discs;
an optical disc storing unit where the optical disc is stored;
a plurality of recording/reproducing units that record/reproduce data to/from the optical disc; and
a library control unit that controls the recording/reproducing units and communicates with the server through the data library I/F unit,
wherein the control unit controls the data archive system to execute first quality inspection of a first optical disc, execute second quality inspection of a second optical disc which is different from the first optical disc when a quality of the first optical disc is judged deteriorated, refer to disc-related information of the first optical disc and disc-related information of the second optical disc recorded on the information storing medium when it is judged that a quality of the second optical disc is deteriorated in the second quality inspection, and estimate a factor that causes the qualities of the first and the second optical discs to deteriorate based on the referred disc-related information, and
wherein the factor of the quality deterioration is estimated from disc-related information that is common to portions of the disc-related information of only a plurality of deteriorated optical discs.

2. The data archive system according to claim 1,
wherein the control unit controls the data archive system to display or notify the estimated factor.

3. The data archive system according to claim 1,
wherein the server comprises an information storing medium for recording the disc-related information associated with the optical disc stored in the data library device, and
wherein the optical disc that becomes objects of the first and the second inspection is selected based on the disc-related information.

4. The data archive system according to claim 1,
wherein the disc-related information is one or more portions of information selected from a group comprising a peculiar ID of the optical disc, a date and a time when the data is initially recorded on the optical disc, a date and a time when the data is lastly recorded on the optical disc, an ID of the recording/reproducing unit that performed recording on the optical disc and a history of the recording/reproducing unit, a date and a time when the optical disc was stored in the data library device, and a storage position of the optical disc storing unit for storing the optical disc.

5. The data archive system according to claim 3,
wherein the disc-related information is one, two, or more portions of information selected from a group comprising a peculiar ID of the optical disc, a date and a time when the data is initially recorded on the optical disc, a date and a time when the data is lastly recorded on the optical disc, an ID of the recording/reproducing unit that performed the recording on the optical disc and a history of the recording/reproducing unit, a date and a time when the optical disc was stored in the data library device, a storage position of the optical disc storing unit for storing the optical disc, and a result of third inspection performed before the first and the second inspection.

6. The data archive system according to claim 1, wherein deterioration of the quality is judged based on an SER.

7. The data archive system according to claim 3, wherein deterioration of the quality is judged based on an SER.

8. A quality inspection method of a data archive system with a server and a data library device for inspecting a recording quality of an optical disc, comprising:
executing, via a recording/reproducing unit, first quality inspection on a first optical disc;
executing, via a recording/reproducing unit, second quality inspection on a second optical disc different from the first optical disc when a quality of the first optical disc is judged as deteriorated;
referring to disc-related information of the first and the second optical discs recorded on an information storing medium, the disc-related information being associated with each optical disc, when a quality of the second optical disc is judged as deteriorated in the second quality inspection; and
estimating a factor whereby the qualities of the first and the second optical discs are deteriorated based on the disc-related information being referred to;
wherein the factor of the quality deterioration is estimated from disc-related information that is common to pieces of the disc-related information of only a plurality of deteriorated optical discs.

* * * * *